UNITED STATES PATENT OFFICE.

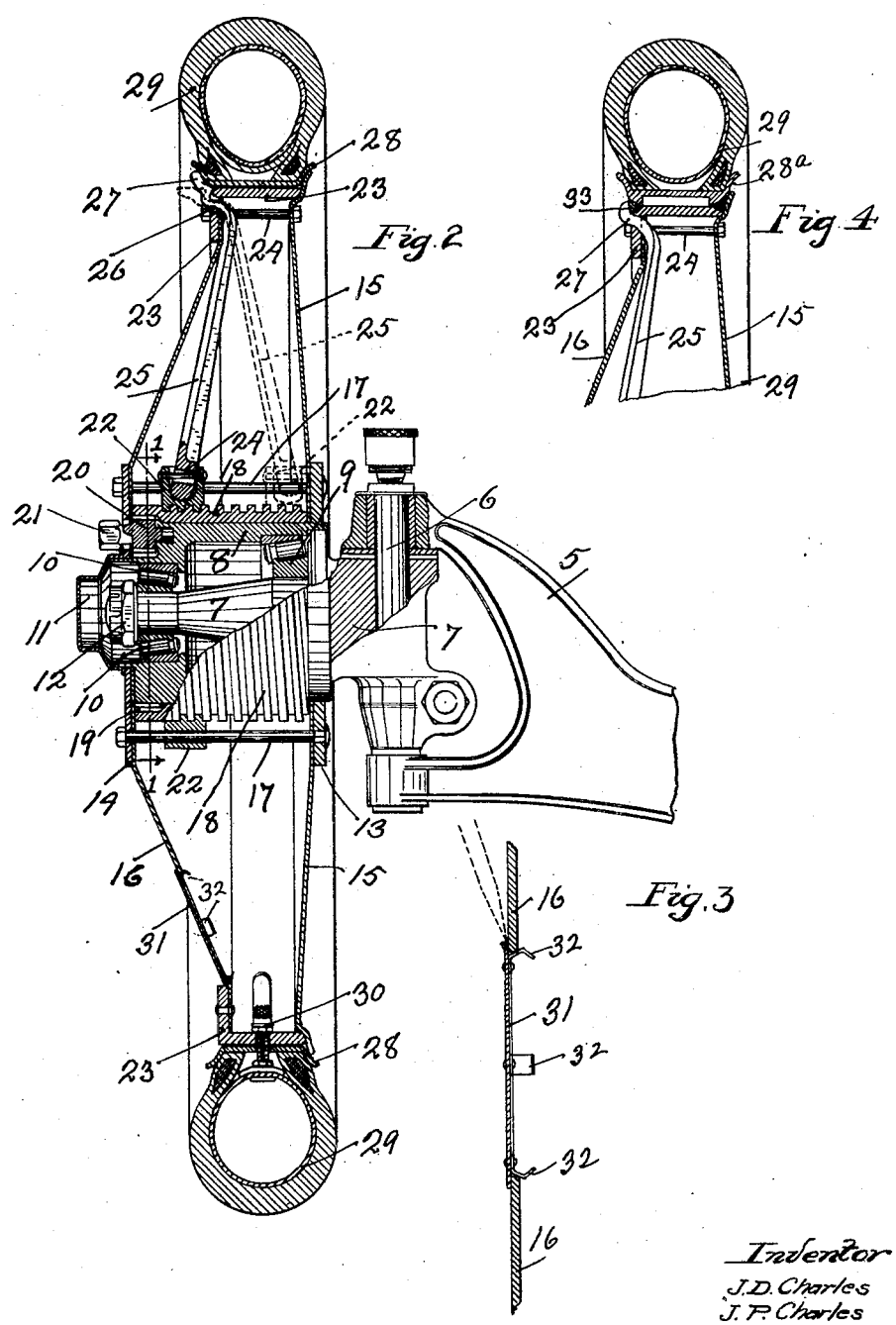

JOHN D. CHARLES AND JOHN P. CHARLES, OF PARK RAPIDS, MINNESOTA.

WHEEL WITH DEMOUNTABLE-RIM FASTENER.

1,412,337.   Specification of Letters Patent.   Patented Apr. 11, 1922.

Application filed January 3, 1921. Serial No. 434,575.

*To all whom it may concern:*

Be it known that we, JOHN D. CHARLES and JOHN P. CHARLES, are citizens of the United States, residing at Park Rapids, in the county of Hubbard and States of Minnesota, have invented certain new and useful Improvements in Wheels with Demountable-Rim Fasteners; and we do hereby declare the following to be a full, clear, and exact description of the invention such as will enable others skilled in the art to which it appertains to make and use the same.

Our invention relates to wheels having demountable rims and is directed chiefly to improved means for detachably securing the demountable rims to the wheel rims proper. The improved device, while adapted for application to various other types of wheels, is, nevertheless, especially adapted for application to what is known as double disk wheels.

Generally stated the invention consists of the novel devices and combinations of devices hereinafter described and defined in the claims.

In the accompanying drawings, which illustrate the invention, like characters indicate like parts throughout the several views.

Referring to the drawings:

Fig. 2 is a vertical section taken approximately on the line 2—2 of Fig. 1, some parts being shown in full and showing also a wheel spindle and a portion of an axle to which it is pivoted;

Fig. 3 is a fragmentary section on the line 3—3 of Fig. 1; and

Fig. 4 is a fragmentary radial section corresponding to Fig. 2 in the line of its section, but illustrating a modified form of demountable rim.

Figure 1:
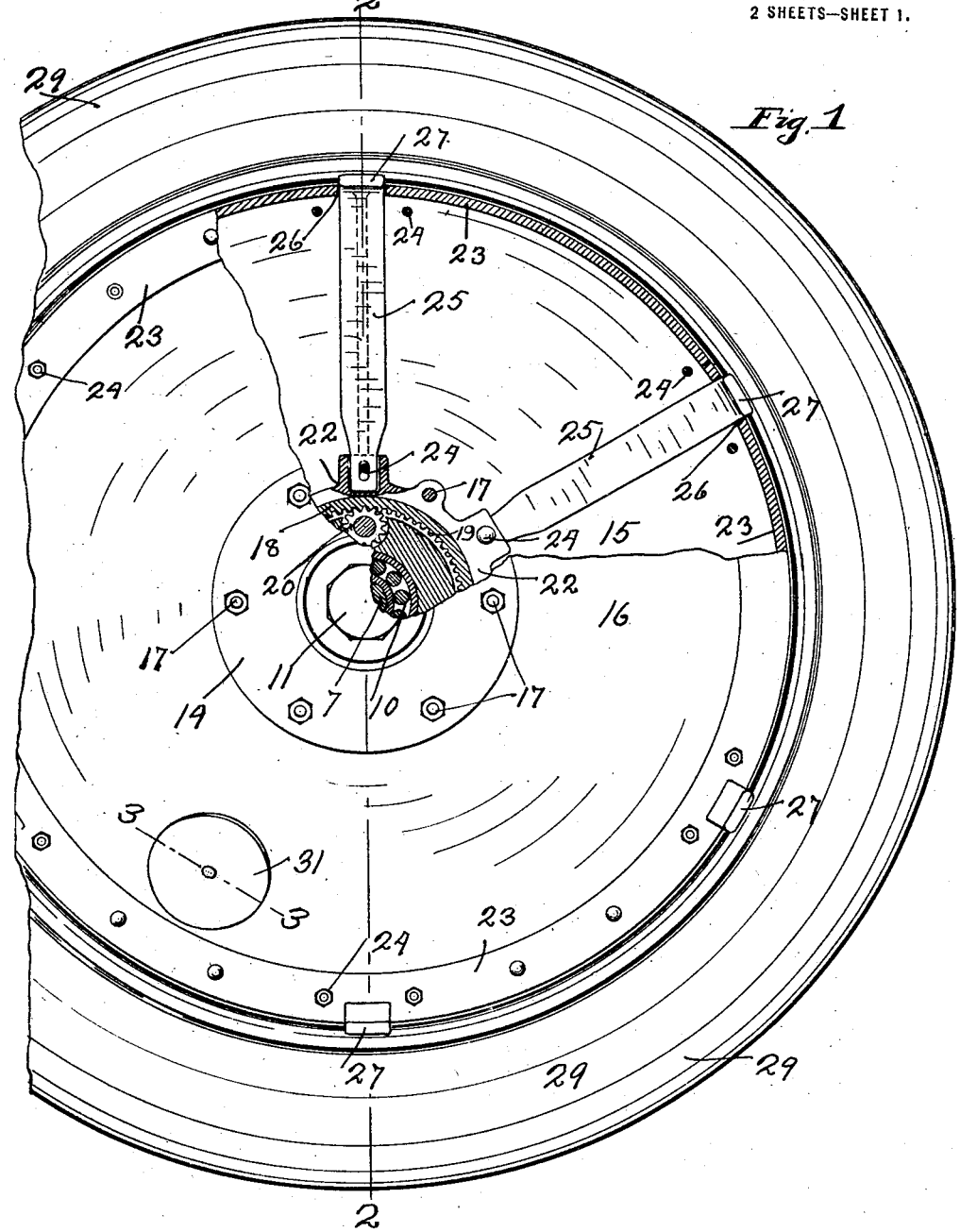
Fig. 1 is a side elevation showing a wheel embodying the invention, some parts being broken away and some parts being sectioned.

The numeral 5 indicates an axle, such as the front axle of an automobile, to which, by means of the customary pivot bolt 6, a wheel spindle 7 is pivotally connected in the usual way.

The numeral 8 indicates a hollow wheel hub, the same being journaled on the spindle 7 preferably by roller bearings 9 and 10. Said hub, as shown, is provided with a removable hub cap 11 and is held on the spindle 7 in the usual or any suitable way by means of a nut 12.

The hub 8 is provided with a rigidly secured preferably integrally cast hub flange 13 near its inner end and outer annular hub flange 14 is removably applied to the outer end of said hub. The numerals 15 and 16 indicate, respectively, inside and outside pressed sheet metal wheel disks, the former of which are riveted or otherwise rigidly secured to the fixed hub flange 13 and the latter of which engages the inner face of the removable hub flange 14. The two disks are securely clamped together by parallel circumferentially spaced nut-equipped bolts 17 that are passed therethrough and also through the hub flanges 13 and 14. The hub flange 14 is removable from the wheel either with or independently of the disk 16.

The numeral 18 indicates an externally threaded arm-adjusting sleeve that is rotatively mounted on the hub 8 and, at its outer end, is provided with internal gear teeth 19. The gear teeth 19 mesh with a spur pinion 20 that is journaled in the hub 8 and in the outer hub flange 14 and, at its outer end, has an angular shank 21 to which a suitable device, such as a socket wrench, may be applied to rotate said pinion and, hence, to cause the threaded sleeve 18 to rotate on the hub 8.

Working with threaded engagement on the sleeve 18 is a nonrotary internally threaded ring-like nut 22. As a convenient means for preventing rotation of the nut 22, while permitting it to move laterally or axially of the wheel, the rods 17 are passed through circumferentially spaced perforations in said nut.

In the shown and preferred arrangement, the wheel rim proper is afforded by a metal rim 23 that is angular or L-shaped in cross section and the flange of which is permanently and rigidly secured to the outer portion of the outside disk 16 by welding, riveting or otherwise. The inner edge of the wheel rim 23 is seated against a shoulder portion of the inside disk 15, and the said elements, 15, 16 and 23 are further rigidly connected by nut-equipped bolts 24, so that the entire wheel becomes a rigid structure.

Located within the wheel and pivotally connected at their inner ends to the common arm-actuating nut 22, by means of loose pivot joints 24, is a plurality of radially extended circumferentially spaced ring-clamping arms 25. The outer ends of these arms 25 are outwardly curved and passed through perforations 26 in the flange of the wheel rim 23. The outer free ends of the arms 25 terminate in clamping fingers 27 that are adapted to engage the outer side of the demountable rim 28, which, as usual, telescopes freely over the wheel rim proper 23. In Figs. 1 and 2, the demountable rim 28 there shown may be assumed to be either of the straight side type or the clincher type, and it is provided with the usual pneumatic tire 29.

The inner tube of the tire is provided with the customary valve stem 30, which projects through a perforation in the wheel rim 23 and, hence, is within the inner chamber of the wheel. To afford access to this valve stem for the purpose of charging the tire, the outside wheel disk 16 is provided with a port or hand hole that is normally closed by a cover 31, shown as provided with spring prongs 32, which detachably clamp the surrounding edge of the port, (see particularly Fig. 3).

The construction illustrated in Fig. 4 is substantially like that already described, but here the demountable rim 28ᵃ is of a slightly different type and includes a wedge-acting retaining ring 33 that is directly pressed by the outer ends of the clamping arms 25.

Operation.

The operation is probably evident, but may be briefly described as follows:

When, by rotation of the pinion 20, the threaded sleeve 18 is rotated in the proper direction, the non-rotary nut 22 may be moved from the full line position into its dotted line position, Fig. 2, and this will rock the clamping arms 25 into positions indicated by dotted lines in Fig. 2, thereby turning the outer ends 27 of said arms radially inward of the demountable rim 28. When the rim-clamping arms 25 are thus moved, they will release the demountable rim 28 and permit the same to be freely slid off from the wheel rim 23.

When the demountable rim is in position on the wheel rim, the threaded sleeve 18 will be rotated in a reverse direction, thereby moving the nut 22 back to its full line position, Fig. 2, and this will cause the outer ends 27, of the several clamping arms 25, to tightly press against the adjacent edge of the demountable rim 28 and securely hold the same on the wheel with the opposite side of said demountable rim pressed against the outwardly projecting marginal portion of the inside disk 15.

The above described device may, therefore, be very quickly operated, either to release or to secure the demountable rim. Obviously, only one operation is required to move all of the several rim-clamping levers to releasing position and only one movement is required to move the same simultaneously to rim-securing or clamping positions. Moreover, the various operative parts, except the projecting ends 27 of the levers 25, are, in the preferred arrangement of the wheel, located inside of the wheel where they are protected from dirt and are out of sight.

It should, of course, be understood that the invention above specifically described, in connection with the drawings, is capable of a large range of modification within the spirit of the invention herein generally disclosed.

What we claim is:

1. The combination with a wheel having a rim proper and a demountable rim, of a plurality of substantially radial circumferentially spaced rim-clamping levers pivotally fulcrumed on the wheel structure adjacent to the rim thereof with their outer ends projecting for engagement with said demountable rim, an externally threaded sleeve rotatively mounted on the wheel hub and held against axial movements, and an axially movable non-rotary nut member working on said sleeve and connected to the inner ends of said clamping levers for simultaneously moving the same.

2. The combination with a wheel having inside and outside disks, a rim proper and a demountable rim, of a plurality of substantially radial circumferentially spaced rim-clamping levers located in the space between said inside and outside disks and pivotally fulcrumed on the wheel structure adjacent to the rim thereof with their outer ends projecting for engagement with said demountable rim, an externally threaded sleeve rotatively mounted on the wheel hub between said disks, a pinion operative on said sleeve to rotate the same from the exterior of the wheel, and a non-rotary nut working on said sleeve and connected to the inner ends of said clamping levers for simultaneously moving the same.

In testimony whereof we affix our signatures.

JOHN D. CHARLES.
JOHN P. CHARLES.